United States Patent
Stark et al.

[15] 3,664,270
[45] May 23, 1972

[54] COVERED HOPPER CAR WITH HATCH COVER MEANS

[72] Inventors: Marvin Stark, Michigan City, Ind.; Willis H. Knippel, Palos Park, Ill.

[73] Assignee: Pullman Incorporated, Chicago, Ill.

[22] Filed: Jan. 2, 1970

[21] Appl. No.: 90

[52] U.S. Cl............................................105/377, 292/256.5
[51] Int. Cl.......................................................B61d 39/00
[58] Field of Search.................105/377; 292/256.5, 241; 220/44

[56] References Cited

UNITED STATES PATENTS

| | | | |
|---|---|---|---|
| 3,522,774 | 8/1970 | Beezhold | 105/377 |
| 1,917,167 | 7/1933 | Tucke | 105/377 |
| 3,401,647 | 9/1968 | Ingram | 105/377 |

Primary Examiner—Arthur L. La Point
Assistant Examiner—Richard A. Bertsch
Attorney—Hilmond O. Vogel and Wayne Morris Russell

[57] ABSTRACT

A hopper car having a roof with an open trough hatch defined by coaming and a plurality of odd numbered hatch cover sections pivotally connected on the roof and overlapping one another, longitudinal and end seal means being along the sides of the coaming cooperative with the longitudinal side and the end portions of the hatch cover sections; and further transverse seam seals located between the cover sections by seal retainers on adjacent cover sections, and hold-down means at the seams of the hatch cover sections and ends of the hatch cover sections and intermediate of the hatch cover sections, the hold-down means being locked by spring lock means on the car roof, the adjacent tapered edges of the longitudinal seals on each of the sections compressingly sealing with one another.

16 Claims, 10 Drawing Figures

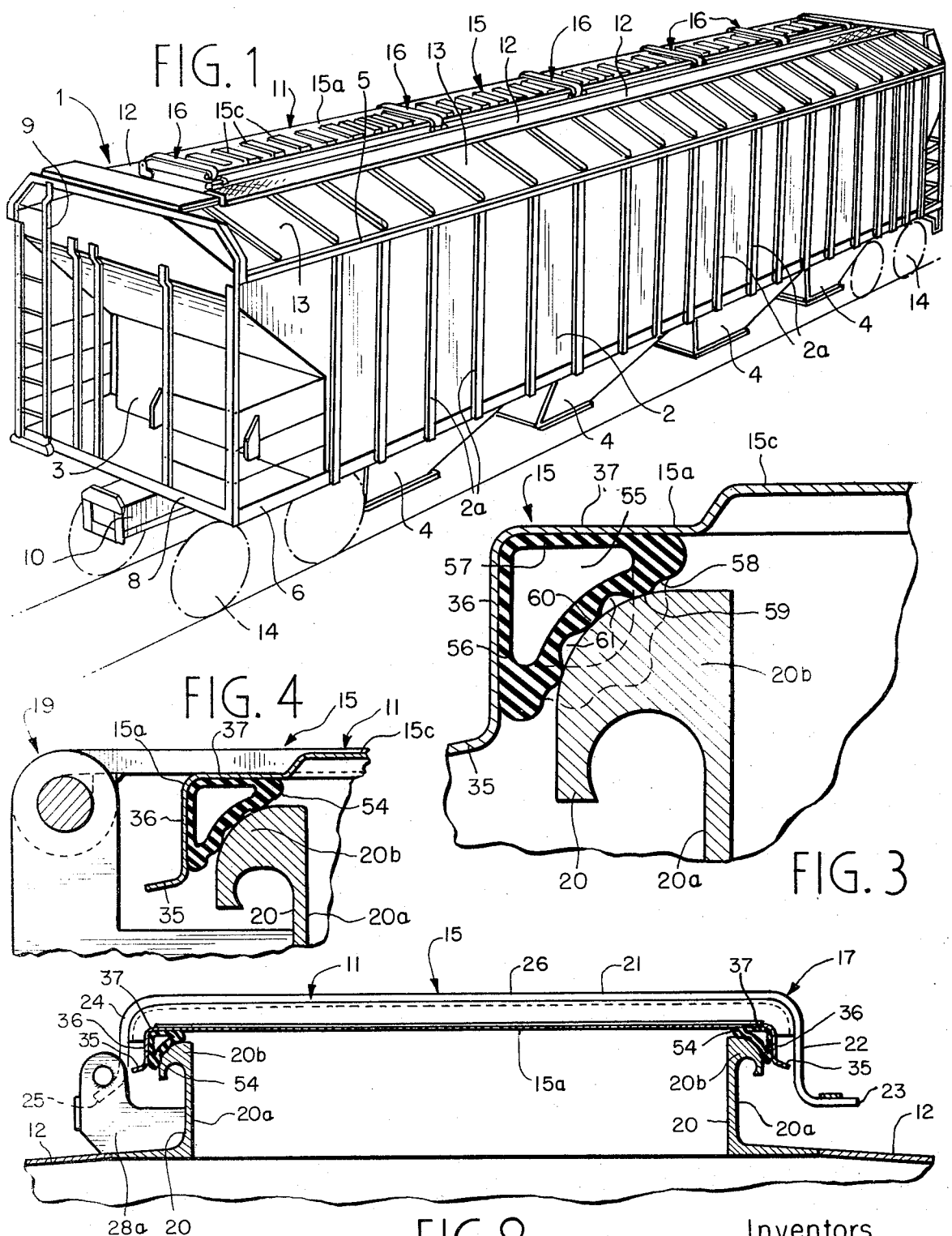

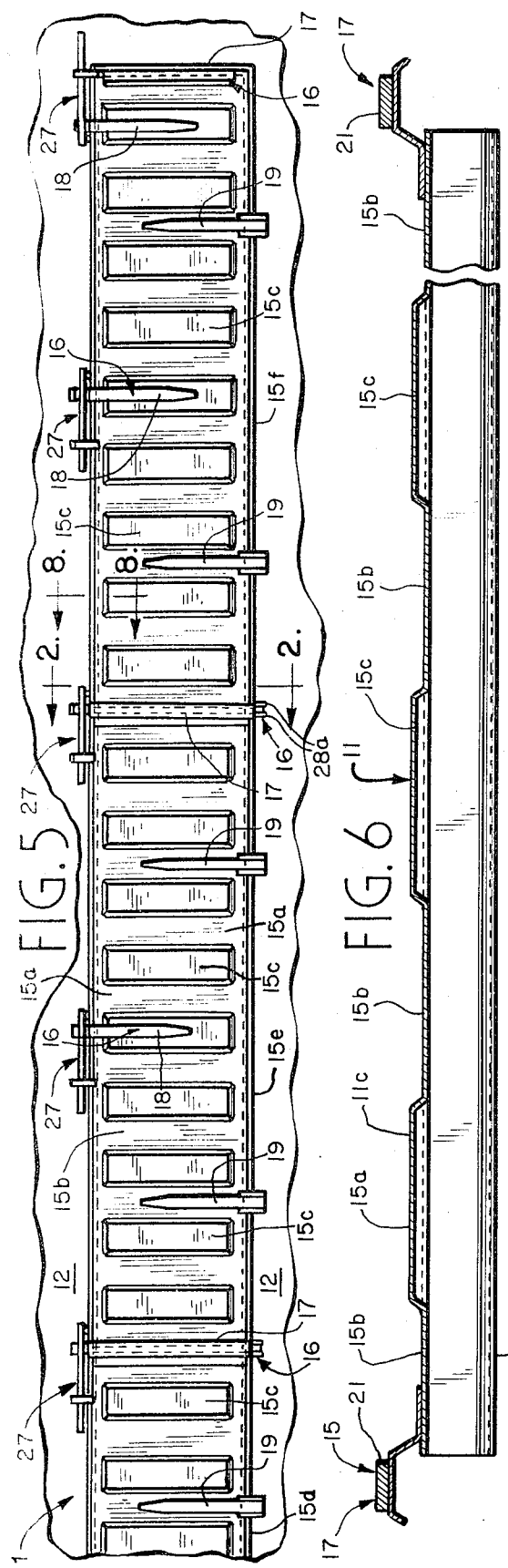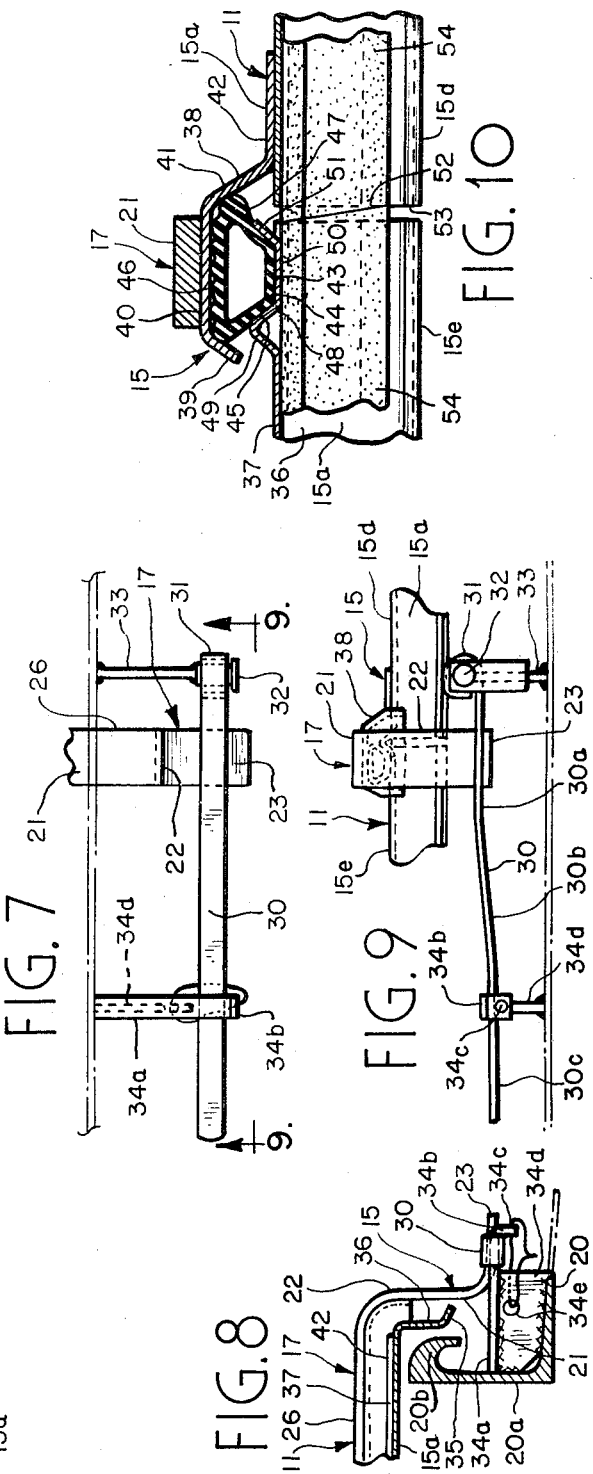

COVERED HOPPER CAR WITH HATCH COVER MEANS

SUMMARY

The invention relates to covered hopper cars and in particular to novel sealing and hold-down means for tying a plurality of hatch cover sections with one another on the hatch of the hopper car.

It is, therefore, a general object of this invention to provide for a sealing and tie-down arrangement for a plurality of overlapping cover sections for the hatch of the hopper car wherein the cover sections have hold-down means that are held by biased or spring lock means at the seam or joints of one section with another.

A further object of this invention is to provide for compression of longitudinally extending seals between the coaming of the hatch and the hopper car hatch cover sections by a hold-down element attached to the hold-down means holding down a pair of adjacent cover sections wherein the hold-down element is located on the side of the cover sections hinged to the car roof portion.

Another object of this invention is to provide for a plurality of hatch cover sections overlapping one another and having seals and seal retainer means at the joints of one car section with another and wherein there is provided hold-down means over the joints tied to the car roof wherein said tying of the hold-down means may be accomplished by spring loaded lock means.

Still another object of this invention is to provide the type of hatch cover sections for the hopper car wherein the sealing means carried longitudinally along the sides of the cover sections and their ends are tapered to dovetail with one another to provide a good butting seal at the joint of one cover section with another.

Another object of this invention is to provide for the arrangement of seals and cover sections as referred to above wherein the transverse seals are placed above the longitudinal seals and where the longitudinal seals are compressed by an element of the hold-down means on the car hinge side and whereby spring lock means act on the hold-down means to compress the longitudinal seals and the transverse seals. The spring locks in addition to being located at the seams or joints between two cover sections are also located at the ends of the hatch and intermediately of a particular hatch cover section.

These and other objects may become apparent from reference to the following description and drawings and dependant claims.

BRIEF DESCRIPTION OF THE DRAWINGS

FIG. 1 is a perspective view of a hopper car utilizing a plurality of hopper hatch cover section and employing the novel hold-down and lock and sealing means of the invention;

FIG. 2 is a cross sectional view of a hatch cover section taken along line 2—2 of FIG. 5 and showing the transverse seal at a joint or seam and means for compressing of the transverse seal as well as the longitudinal seals to provide a good seal arrangement between the cover sections and the coaming;

FIG. 3 is enlarged cross sectional view of the end seal, a hatch cover section and the end coaming;

FIG. 4 is an enlarged cross sectional partial view partially showing the hinge connection of a cover section and the longitudinal seal;

FIG. 5 is a top partial plan view of the inter-connected hatch cover sections with hatch cover sections with their hold-down and lock means;

FIG. 6 is a longitudinal sectional view through the central hatch cover section;

FIG. 7 is a plan view of the sprung lock means for locking the hold-down means;

FIG. 8 is a sectional view taken along line 8—8 of FIG. 5;

FIG. 9 is a sectional view taken along line 9—9 of FIG. 7; and

FIG. 10 is a sectional view showing the butting relation between two adjacent longitudinally spaced hatch cover seals.

DETAILED DESCRIPTION

With reference now to the drawings and in FIG. 1 there is shown a covered hopper car 1 having side walls 2 and end walls 3. The car bottom is provided with hoppers 4 and the upper parts of the side walls are provided with top plates 5 and the lower parts of the side walls are provided with side sills 6 and the ends of the car are provided with end sills 8 and ladders 9. The car has a center sill 10 running down longitudinally of the center of the car. The top of the car has a roof 11 including flat portions 12 and slope portions 13. The car is supported on the usual trucks 14.

With reference now also to FIGS. 2, 5 and 6 there is shown a hopper roof hatch means 15 through which the bulk material such as grain is received and is defined by a coaming 20 covered by hatch cover means 15a which consists of a plurality of hatch cover sections or sheets, namely, a center hatch cover section 15d, two or more, intermediate hatch sections 15e and two end hatch cover sections 15f. The hatch cover sections are provided with hatch sheet stiffeners 15c. The center hatch cover section has end portions which overlap the ends of the intermediate hatch cover sections and intermediate hatch cover sections have outer end portions which overlap the inner end portions of the end hatch cover sections. Each hatch cover section is held to the other and held down on the coaming by hold-down fitting and lock means 16 which include the joint or seam hold-down means or bar means 17 and the intermediate hold-down means or bar means 18. The hold-down bar means 17 are also provided at each outer end of each of the end cover sections 15f for holding the end hatch cover sections down against the coaming and the roof. The hold-down means 17 and 18 are fastened on top of the respective cover sections by welding. On one side of each of the cover sections is pivotally attached to the roof (see FIG. 4) by hinge means 19. It is also seen that the coaming 20 comprises an upright wall portion 20a and an upper widened and curve end portion 20b which has its outer curved portion receiving the longitudinal rubber or elastomatic seal means 54, as seen in FIGS. 2–4. The joint or seam hold-down means or bar means and the intermediate hold-down means and the end hold-down means is held fast to the roof adjacent the coaming on the opposite to where the hinge means 19 are attached. These hold-down means 16 are held down by the spring lock means 27. Thus it is seen that each cover section is provided with a hold-down means at a seam or at the end and also a hold-down means intermediate the ends of the cover section and each cover section is provided with a pair of hinges 19, such an arrangement best being seen in FIG. 5.

The joint hold-down means 17 includes the transverse hold-down bar 21, see FIG. 2, 6–10, which has a depending arm 22 for the spring lock means 27 and an in-arm portion 23 of the arm 22. On the opposite end of the bar 21 there is provided a depending arm 24 for compression of the longitudinal seal means 54 and the transverse seal means 43. The depending arm 24 is provided with an angle end part 25 which in the closed position of the respective cover section goes under and up against the pin 29 on the hold-down lug 28 on the hinge side of the cover section. The bar 21 has a transverse horizontal tie down arm portion 26 which is attached to the hatch cover section by welding. The arm 25 is under a spring load when it seats underneath the pin 29 and the result is that the bar then in the closed position of the hatch cover section compresses the transverse and longitudinal seals. The spring lock means 27 are located on the side opposite the side of the cover section that mounts the hold-down lugs 28 which includes the ears 28a which hold the pin 29 (see FIGS. 2–5) or on the non-hinged side. The spring lock means 27 is mounted on each cover section adjacent the ends and intermediate portions thereof and includes a spring bar or lever arm 30, see FIGS. 7–9, and includes a hinge end 30a which is generally horizontal, an intermediate outwardly taped sloped portion 30b and a free end portion 30c, the bar 30 having at its hinged end a hinge 31 connected to hinge pin 32 on support 33 for the spring arm 30. The hinged arm portion 30a extends over and against the top surface of the arm 23 of the cross bar hold-down bar 21 to urge the hold-down bar 21 against the transverse seal means 43 and and the longitudinal seal means 54. The end arm portion 30c of the spring arm 30 is held down in tension by the lock member 34 which has a horizontal arm 34a, a vertical end catch 34b to prevent spring arm 30c from slipping out, and a seal wire eye 34c. The lock member is further provided with a standard or support 30d mounted on the cover section and has a second eye 34e and a wire is fed through eyes 34c and 34e whereby the arm 30c is held to the lock member 34 in a seal fashion. If the seal is broken this is evidence that the hatch cover has been tampered. The spring bar arm portion 30b sloping diagonally downward is illustrative of the fact that the spring bar is placed under a spring tension for placing a downward load on the hold-down means 17 or 18. The hold-down means 18 differs from the hold-down means 19 in that it does not have locking element 25 on the hinge side of the cover. Each hatch cover section 15a in cross section, as shown in, for instance, FIG. 8, includes a diagonal end portion 35, in upright or vertical sheet portion 36 and a top or horizontal sheet portion 37.

As seen in FIG. 10, the transverse seal means 43 is spaced above the longitudinal seal means and is provided with an overhead seal retainer 38 which is attached to a center hatch cover section 15d and comprises a downwardly diagonally extending free end sheet portion 39 and a top or horizontal sheet portion 40 and an intermediate diagonally extending sheet portion 41 and an attached end horizontal sheet portion 42 welded on the top of the cover sheet section which is the center cover sheet section 15d. The transverse seal 43 includes a horizontal bottom wall portion and slope side portions 45 and 47 and undulated or corrugated horizontal top portion 46 to define a hollow center seal. The transverse seal means 43 is nestled in the underposed seal retainer member 48 which includes an inverted V-shaped sheet portion 49, a bottom horizontal seat sheet portion 50 and an upturned free end sheet portion 51 which cradles the bottom portion of the seal. The retainer end portion 51 sufficiently compresses or dimples in the seal wall 47 to cause it at its upper end to bulge out against the inside of the upper retainer wall 41 to insure a very good seal between the joints where two cover sections come together. The hatch cover sections 15d and 15e have respective vertical edges adjacent one another but spaced apart from one another whereas the vertical edges of the respective longitudinal seals 54, namely, sloped or tapered edges 52 and 53 compress against one another sufficiently to insure a good seal between the two longitudinal sections.

As seen in FIGS. 2–4 the longitudinal rubber seal which is wrapped around the ends of the coaming at the ends of the car is triangular shaped and defines aperture or hole 55 and includes an outside vertical wall 56 and a top horizontal wall 57 and an inside undulated diagonal wall that engages the curved portion of the coaming portion 20b, the undulated portion defining pocket 61 with the coaming. The longitudinal seal means as stated above in fact completely encircles the coaming and seals with the end of the hatch cover sections, there being no transverse seal means 43 at each end of the hatch means. Further, the end spring lock at each end of the car is similar in construction to the intermediate spring locks whereby the ends of the car are tied thereto in a fashion similar to the intermediate portions of the cover sections.

Thus what is provided for in this novel covered hopper car arrangement is a plurality of overlapping hatch cover sections which at each seam defined by two adjacent sections there is provided transverse seal means above and cooperative with longitudinal seal means encircling the coaming and wherein there is further provided hold-down means extending over the seam of the hatch covering sections and intermediate the cover sections and at the end of the cover sections, the hold-down means at the seam areas being held down on one side by a spring flange engaging the roof mounted pin and on the other side a spring lock means holding down under load the hold-down bar.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a covered hopper car having a car body and a car roof therefor:
   an open hatch in the roof and coaming about said hatch,
   a plurality of longitudinally extending overlapping hatch cover sections mounted on said coaming,
   longitudinally extending first seal means disposed between the hatch cover sections and the coaming,
   two adjacent hatch cover sections having longitudinally extending and longitudinally spaced overlapping portions located above the longitudinally extending first seal means,
   transversely extending upper and lower seal retainers each attached to a respective overlapping portion to define a transverse seam,
   transversely extending second seal means entrained between each of the retainers and above the first seal means, and
   transversely extending hold-down means over said seam including lock means on said roof holding said retainers against said transverse and longitudinal seal means at the seams.

2. The invention according to claim 1, and
   said hold-down means including a transversely extending hold-down bar being held against movement by said lock means.

3. The invention according to claim 2, and
   said bar having a first end portion, said roof having on one side hinge means connecting with each of said hatch cover sections, and tie down means on said one roof side, said bar end portion being pulled down by said tie down means as said hopper section is hinged to a closed position.

4. The invention according to claim 3, and
   said bar having a second end portion,
   said lock means having a resilient means engaging and urging said second end portion and said bar thereby downwardly to compress both seal means.

5. The invention according to claim 1, and
   said seal means including a plurality of longitudinal seal sections,
   each hatch cover section carrying a respective longitudinal seal section, each seal section having an end portion contoured for flush abutting engagement with a complementary end portion of another longitudinal seal section on the adjacent overlapping cover section.

6. The invention according to claim 1, and
   further hold-down means tying the hatch cover sections to the roof intermediate the ends of the hatch cover sections.

7. A covered hopper car comprising:
   an open hatch cover means defined by coaming,
   a plurality of overlapping hatch cover sections mounted on said coaming,
   longitudinal and end seal means between said hatch cover sections and said coaming,
   each a pair of adjacent hatch cover sections defining overlapping seam means,
   said seam means including seal retainer means having an upper retainer on the end of one hatch cover section and a lower retainer on the end of the other hatch cover section,
   transverse seal means between the retainers,
   hold-down means over the seam means and including lock means tying the hold-down means against hatch cover seams and compressing the transverse seal means and the longitudinal and end seal means.

8. In a covered hopper car having a roof including coaming defining an open hatch;
  a plurality of longitudinally extending and longitudinally spaced overlapping hatch cover sections mounted on said coaming:
  said adjacent hatch cover sections having longitudinally extending portions overlapping one another,
  said overlapping portions including a transversely extending overhead retainer and a transversely extending lower support retainer defining a seal receiving structure,
  a transversely extending seal compressingly disposed in said seal retaining structure to thereby define a seal seam, and
  hold-down means mounted on said overlapping portions and compressing the transverse seal means at the seam,
  each of said hinge cover sections being pivotally mounted to one side of the car and being locked to the other side of the car by said hold-down means.

9. The invention according to claim 8, and
  longitudinal seal means disposed on each side of the hatch between the cover sections and the coaming.

10. The invention according to claim 9, and
  said hold-down means including bar means attached to the outer overlapping portions of the overlapping sections.

11. The invention according to claim 10, and
  said bar means having an extension extending transversely to the hinged cover side of the car, and
  pin means on the roof pulling the extension down for compressing the transverse seal means in the closed position of the hatch cover sections.

12. The invention according to claim 10, and
  said bar means including an extension element extending transversely from the upper overlapping retainer, and
  spring lock means mounted on the roof and coupleable with the extension element and resiliently compressing the extension element and the transverse seal means thereby.

13. The invention according to claim 10, and
  said bar means having an extension extending transversely to the hinged cover side of the car,
  pin means on the roof pulling the extension down for compressing the transverse seal means in the closed position of the hatch cover sections,
  said bar means including an extension element extending transversely from the upper overlapping retainer, and
  spring lock means mounted on the roof and coupleable with the extension element and resiliently compressing the extension element and the transverse seal means thereby.

14. The invention according to claim 12, and
  said spring lock means including,
  a hinged mount on the roof,
  a spring arm having one end attached to said hinge mount,
  said spring arm having a free end and having a central portion between the hinge mount and the free end coupleable with the extension element,
  a lock mount on the roof coupling with the free end of the spring arm.

15. The invention according to claim 8, and
  said hold-down means including bar means attached to the outer overlapping portion of the overlapping sections,
  said bar means having a spring extension member extending transversely to the side of the car where the cover sections are pivotaly mounted,
  pin means mounted on the car roof,
  said extension member being receivable under said pin means and pulled down thereby upon pivotal movement of the cover section to the closed position for compressing the transverse seal means.

16. The invention according to claim 15, and
  longitudinal seal means disposed on each side of the hatch between the cover sections and the coaming and below the transverse seal means and being compressed by said pin means in the closed position of the hatch cover section.

* * * * *